United States Patent
Nguyen et al.

(10) Patent No.: US 10,140,083 B1
(45) Date of Patent: Nov. 27, 2018

(54) PLATFORM FOR TAILORING MEDIA TO ENVIRONMENT FACTORS AND USER PREFERENCES

(71) Applicant: Amazon Technologies, Inc., Seattle, WA (US)

(72) Inventors: Luan Khai Nguyen, Auburn, WA (US); William Alexander Strand, Sammamish, WA (US)

(73) Assignee: Amazon Technolgies, Inc., Seattle, WA (US)

( * ) Notice: Subject to any disclaimer, the term of this patent is extended or adjusted under 35 U.S.C. 154(b) by 486 days.

(21) Appl. No.: 14/863,213

(22) Filed: Sep. 23, 2015

(51) Int. Cl.
*G06F 17/00* (2006.01)
*G06F 3/16* (2006.01)
*G11B 27/031* (2006.01)
*G11B 20/10* (2006.01)

(52) U.S. Cl.
CPC ............ *G06F 3/165* (2013.01); *G11B 27/031* (2013.01); *G11B 2020/10546* (2013.01)

(58) Field of Classification Search
CPC ................ G06F 3/165; G06F 17/3074; G06F 17/30749; G06F 17/30761; G11B 27/031; G11B 2020/10546
See application file for complete search history.

(56) References Cited

U.S. PATENT DOCUMENTS

| | | | | |
|---|---|---|---|---|
| 2009/0078108 A1* | 3/2009 | Rowe | ................... | G10H 1/0025 84/601 |
| 2014/0334644 A1* | 11/2014 | Selig | ...................... | H03G 5/165 381/108 |

\* cited by examiner

*Primary Examiner* — Fan Tsang
*Assistant Examiner* — David Siegel
(74) *Attorney, Agent, or Firm* — Kilpatrick Townsend & Stockton LLP

(57) ABSTRACT

Techniques described herein include a platform for generating customized media content to a user. In some embodiments, a service provider may receive attribute data related to an environment in which a media file is to be presented. In some embodiments, the service provider may receive a user configuration setting indicating one or more preferences for media presentation. The service provider may store media content as separate components, with each component being separately adjustable. Upon receiving a request for particular media content, the service provider may generate a media file from the stored media content in accordance with the user configuration settings and/or environment attribute data.

19 Claims, 12 Drawing Sheets

US 10,140,083 B1

PLATFORM FOR TAILORING MEDIA TO ENVIRONMENT FACTORS AND USER PREFERENCES

BACKGROUND

Enjoyment of various media content often varies according to individual preference. Some individuals may have preferences that are vastly different than those shared by the average consumer. However, producers of these media files are often forced to conform media files to the preferences of a typical consumer. For example, when listening to music, each consumer may enjoy a different aspect of a song. However, a mixing artist must compile the song file in the way that it pleases the most people, often leaving some consumers disappointed.

BRIEF DESCRIPTION OF THE DRAWINGS

Various embodiments in accordance with the present disclosure will be described with reference to the drawings, in which.

DETAILED DESCRIPTION

Figure 1:
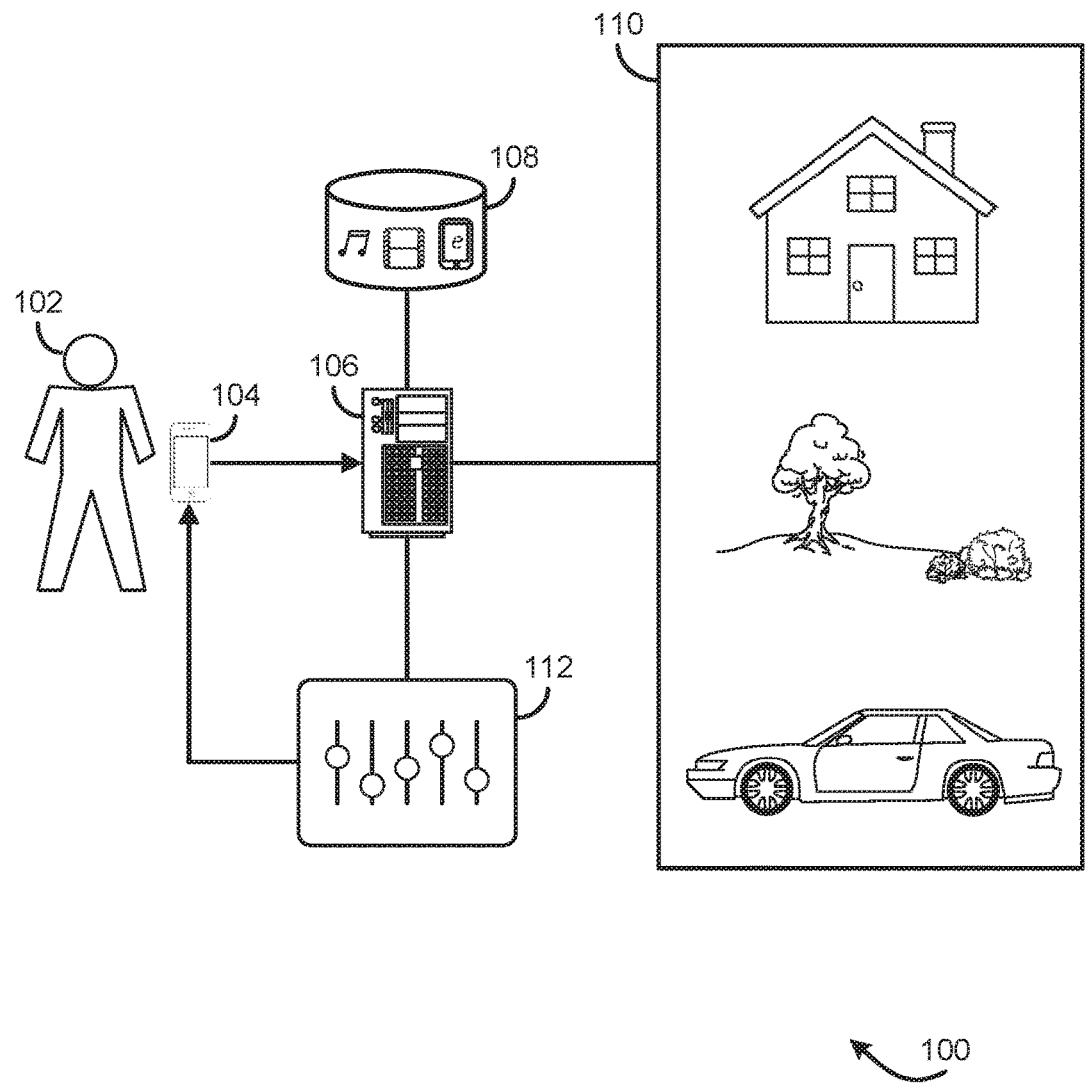
FIG. 1 depicts an illustrative user interaction with a media enhancement platform 100 in accordance with at least some embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Described herein is a special purpose device capable of, using one or more input sensors, monitoring media presentation and/or users' locations and providing adjustments to the media content to account for various environmental factors. Also described herein is a technique for storing and managing media content data that facilitates tailoring (e.g., customizing) of media files. Additionally, this disclosure describes a platform for providing a user with the ability to set custom user configuration settings that may subsequently be used to generate tailored media files. For the purposes of this disclosure, custom configuration settings include settings calculated to optimize consumption of a media file by a particular person or in a particular environment. Custom configuration settings may be temporal in nature. For example, a custom configuration setting may be applied based on where a user is currently located with respect to a media player, other users currently present, or any other temporary factor based on a current context. As these factors change, the custom configuration settings may also be recalculated.

In accordance with at least some embodiments, a device having multiple sensors may be utilized to capture attributes of an environment in which media is being presented. The device may adjust components of a music file to account for the environment attributes. Additionally, a user may provide one or more user configuration settings to a media device or a streaming service. The user configuration settings may also be used to adjust components of a music file in order to generate a tailored media file. For example, music content may be stored as separate tracks. Upon receiving a request to provide the music content, the service provider may set a relative volume for each track according to specified user preferences. The service provider may then generate a music file to be provided to the requestor.

By way of illustrative example, a music player device may be located in an enclosed space. By emitting a high frequency sound and detecting an echo response, the device may calculate the dimensions of the enclosed space in which it is located. The device may then calculate a more optimal mix for music that it plays. For example, the device may determine that a high level of bass will result in a "bass tip up" as the device is located close to a wall. The device may then lower the level of bass directed at the wall. Alternatively, the device may begin playing a music file and may subsequently detect a large amount of echo feedback. The device may then adjust one or more components of the music file to reduce the echo feedback. A user may also be given the ability to set his or her preferences as to how the music should sound. The user may determine that certain instruments or vocal types should be more prevalent in the music as it is being played by the device.

FIG. 1 depicts an illustrative user interaction with a media enhancement platform 100 in accordance with at least some embodiments of the disclosure. In FIG. 1, a user 102 is depicted as interacting, via a user device 104, with a service provider 106. The user device may be any device capable of receiving user input and interacting with, and receiving media content from, a service provider. For example, the user device may be a mobile phone, an electronic book (i.e., an e-book), a speaker device, or any other suitable device. As indicated by the arrow leading from user device 104 to service provider 106, a user device may send a request to the service provider related to a media file. The service provider may maintain, at a media data store 108, various media files (e.g., music, movie, audio book, e-book, etc.). The media files may include one or more formats for each file (e.g., MP3, MP4, .jpg, .png, etc.). In some embodiments, media files may be stored as separate components of the media file. For example, a music file may contain separate audio tracks for each component (e.g., instrumentals, vocals, etc.) that may be combined to create a digital music file. In some embodiments, the service provider may maintain an electronic library of media files, some of which may be associated with an account of the user 102. For example, the user may have an account that may be accessed via login information or via recognition of the user device. In this example, the user may be associated with a personal library of media files, or a subset of the media files stored in the media data store 108. In at least some embodiments, the service provider 106 may be a provider of streaming media services. For example, the user 102 may be given the ability to request streaming of a particular media file stored in the media data store 108 to be streamed to the user device 104. Streaming may refer to a method of transmitting or receiving data over a computer network as a steady, continuous flow, allowing playback to proceed while subsequent data is being received. In some embodiments, streaming may include maintaining a memory buffer at the client. In some embodiments, the service provider may monitor network conditions between the server and the client.

In accordance with at least some embodiments, one or more sensors of the user device may collect information related to an environment 110 in which the media is being consumed. The user device 102 may be equipped with one or more sensors configured to detect environmental attributes. For example, the user device 102 may include a photovoltaic diode capable of assessing a light level, a microphone capable of detecting audio input, a camera capable of detecting visual input, or any other suitable sensor capable of detecting input from an environment 110. In some embodiments, the user device 104 may output a signal through one channel and detect a response via a separate channel. For example, the user device may output a high frequency sound via speakers of the user device, and may receive an echo via the user device's microphone. Once an indication of environmental attributes have been received by the user device and sent to the service provider 106, the service provider may tailor the media requested by the user 102 prior to its consumption by the user.

In accordance with at least some embodiments, a media tailoring module 112 may be configured to alter or generate a media file prior to sending the file to a user device. For example, the user may request a music audio file from the service provider, and the service provider may detect that the user is located in a small enclosure. In this example, the service provider may determine that a large amount of bass may result in substantial echoing. The service provider may subsequently generate a version of the audio file that has a lowered bass level or bass volume. In some embodiments, a user may be given the ability to edit or configure user settings applied to the media file by the media tailoring module 112. For example, a user who is fond of female vocals may indicate this preference in a user setting to be applied to his or her streaming music. In this example, each media file may be altered or generated with an added emphasis on female vocals. Once the media file has been generated, it may be sent to the user device 104 (as indicated by the arrow leading from 112 to 104) or to a separate device.

At least some of the advantages of the described media enhancement platform 100 should be apparent to one skilled in the art. For example, a user may store separate configuration settings for each media file or media genre so that each media file may be played with the user's preferred settings regardless of the device upon which it is played. Additionally, because media files may be streamed to the user device after being tailored, embodiments of the disclosure allow a user to impute capabilities to the user device that it may not normally have. For example, the use of a tailoring module that includes an equalizer may give the user the ability to use the functionality of an equalizer even if the user device does not have normally have equalizer capabilities.

Figure 2:
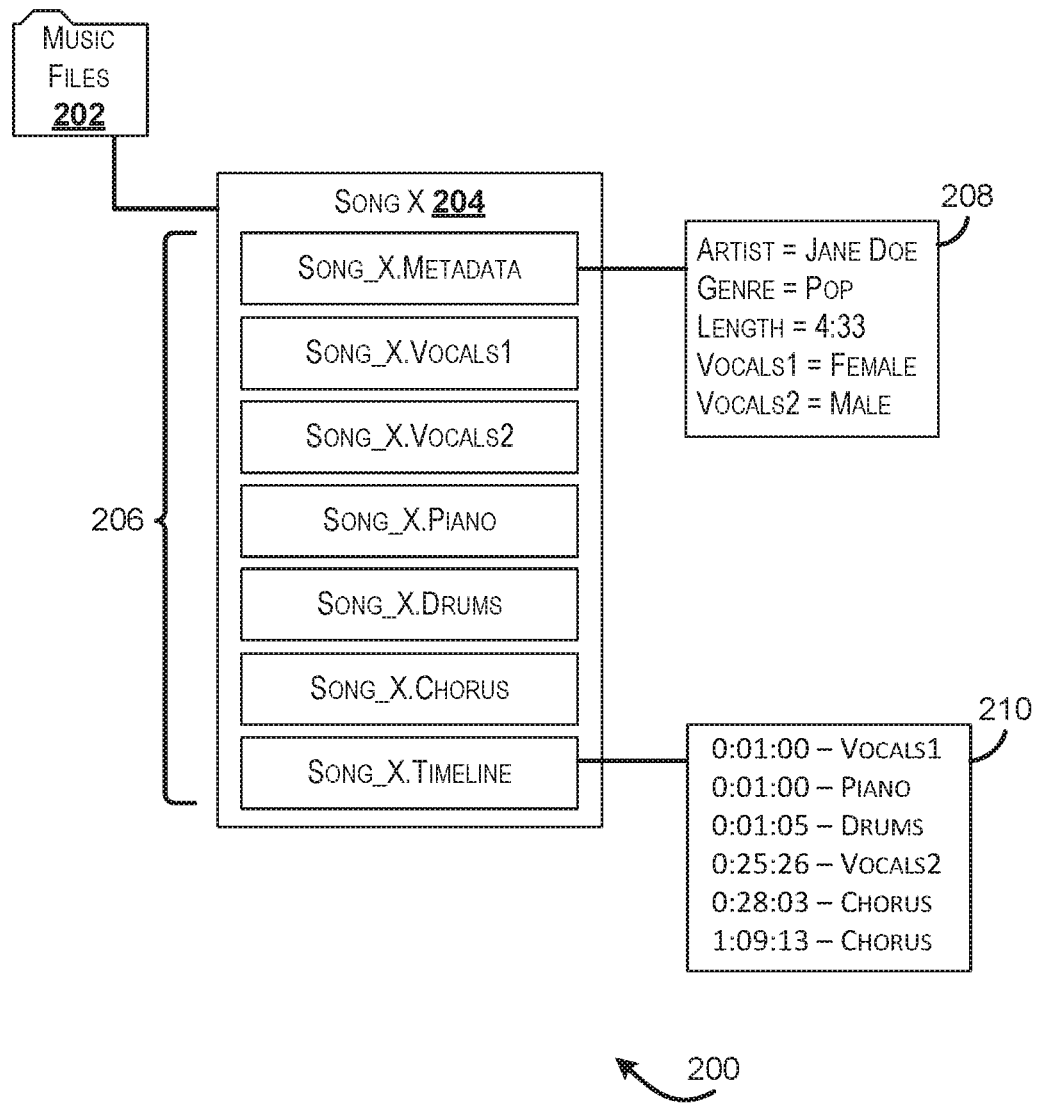
FIG. 2 depicts an illustrative example media file data storage technique useful for enabling on-demand generation of tailored media files in accordance with at least some embodiments.

FIG. 2 depicts an illustrative example media file data storage technique useful for enabling on-demand generation of tailored media files in accordance with at least some embodiments. In at least some embodiments, a media file directory may contain unformatted media files, or raw separated signal data. For example, in a directory of music files 202, a particular music file 204 may include, or be associated with, separate component tracks 206. For example, the music file may contain a separate track for each instrument, each vocal role, and each chorus in the song. This allows the service provider to generate a music file of virtually any format in which one or more separate tracks have been individually altered or omitted. For example, the service provider may generate an MP3 file, an MP4 file, a .wav file, or any other suitable file format depending on the capabilities of the user device and/or the type of file requested. The generated file may be sent to the user device or stored in temporary storage for retrieval by the user device, allowing music to be custom tailored to each user without consuming massive amounts of memory.

In order to facilitate the generation of a music file 204 according to a specific user's configuration settings, a music file 204 may contain a metadata file 208 and/or a timeline file 210. A "file" may be any type of document capable of storing information or instructions, such as a text document or database table. Metadata related to each song may be stored in the metadata file 208, and may include a genre, an artist name, the length of the song, or any other suitable information. In addition, a timeline file 210 may include any information useful for compiling the multiple separate tracks into a single music file. For example, the timeline file 210 may include information related to timing of particular component tracks. In some embodiments, the music file 204 may include additional components that may not be typically used. For example, a music file 204 may include a lyrics file that includes a text version of the song lyrics. If a user requests a karaoke version of the song, then the service provider may generate a version from which the vocals have been omitted and the lyrics have been added.

Although FIG. 2 depicts an audio media file, it should be noted that this is for illustrative purposes only. The described techniques could equally apply to other types of media files. For example, the media file 204 might be a movie file or a portion of a movie file. For example, media file 204 may comprise a two-second portion of video, with each of components 206 corresponding to objects or scenes within the two-second portion of video. In some embodiments, the service provider may stream a series of two-second video files to a user device, which may buffer the video files and play them sequentially.

Figure 3:
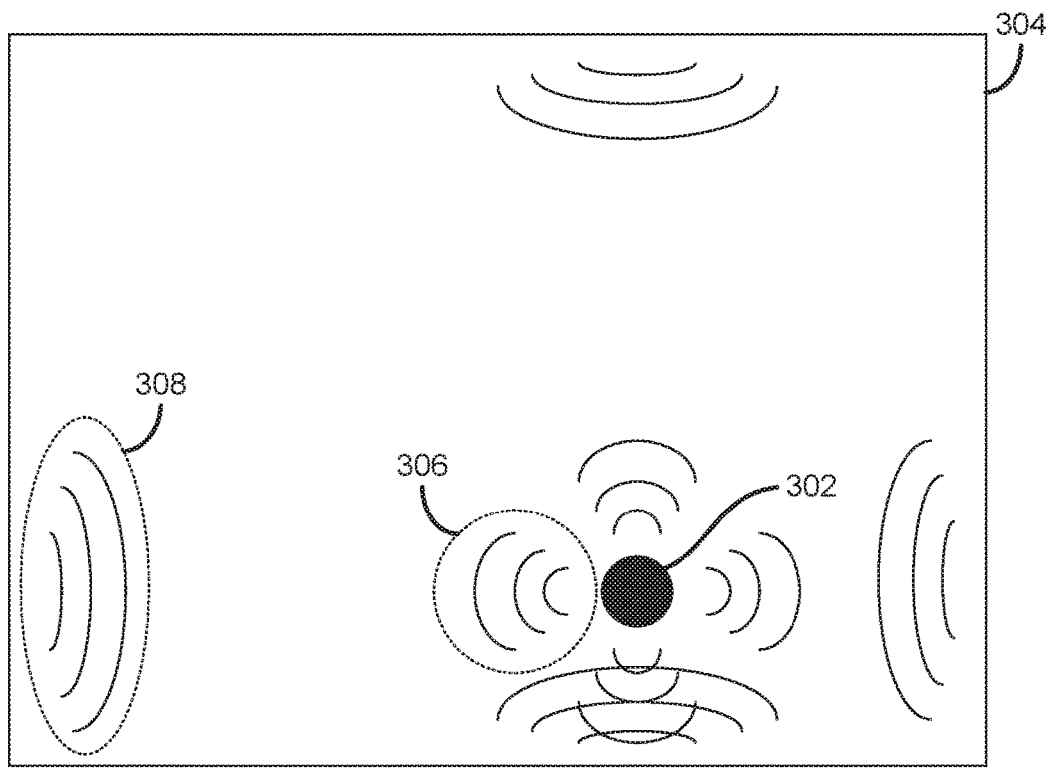
FIG. 3 depicts a technique for assessing environmental attributes associated with a user device in accordance with at least some embodiments.

FIG. 3 depicts a technique for assessing environmental attributes associated with a user device in accordance with at least some embodiments. In FIG. 3, a user device 302 is located in an enclosed space 304. User device 302 may be configured to emit a signal output 306 and detect a signal response 308. For example, the user device 302 may emit a high frequency audio signal 306 (e.g., an audio signal inaudible to a human) and may contain a microphone configured to detect an echo response 308. In this example, the user device 302 may calculate the dimensions of the room or locations of objects in the room based on elapsed time. In accordance with at least some embodiments, the user device 302 may be a speaker device configured to emit sound as a part of a media file. For example, the user device may emit music. In this example, the user device may be configured to analyze the acoustic properties of the room based on the music's echo that is detected by the user device. In at least some embodiments, the user device 302 may identify particular components that are more prevalent in the received signal response 308 and may reduce the use of those components. For example, a user device containing multiple speakers arranged in a circle and configured to provide 360 degrees of sound may also include multiple microphones, or other feedback detectors, configured to detect auditory echoes from all directions. If a microphone detects an echo containing a significant amount of bass from one direction, then the user device 302 may be configured to reduce the amount of bass being generated by the speakers located on the side at which the echo is received. It should be noted that a number of echo reduction and echo cancellation techniques are known in the art and may also be employed by the current device.

In at least some embodiments, the service provider may be a provider of a media streaming service that streams media to the user device. In accordance with at least some embodiments, at least one attribute of the enclosure 304 may be communicated to and stored by a service provider. The service provider may subsequently generate or configure the streamed media in accordance with the attributes provided. In some cases, different generated media files may be played simultaneously by the same user device. For example, a subset of the speakers located on the user device may play one media file while the rest of the speakers play a separate media file. By way of a more illustrative example, the service provider may generate two file versions of the same song, one of which contains a different configuration of audio components (e.g., instruments, vocals, etc.). The two file versions may be played by user device 302 through two sets of directional speakers, so that listeners of the user device 302 may each hear two different versions of the same song depending on where they are located. Additionally, the service provider may configure the streamed media according to which users are currently consuming the media. This is described in more detail with respect to FIG. 4 below.

Figure 4:
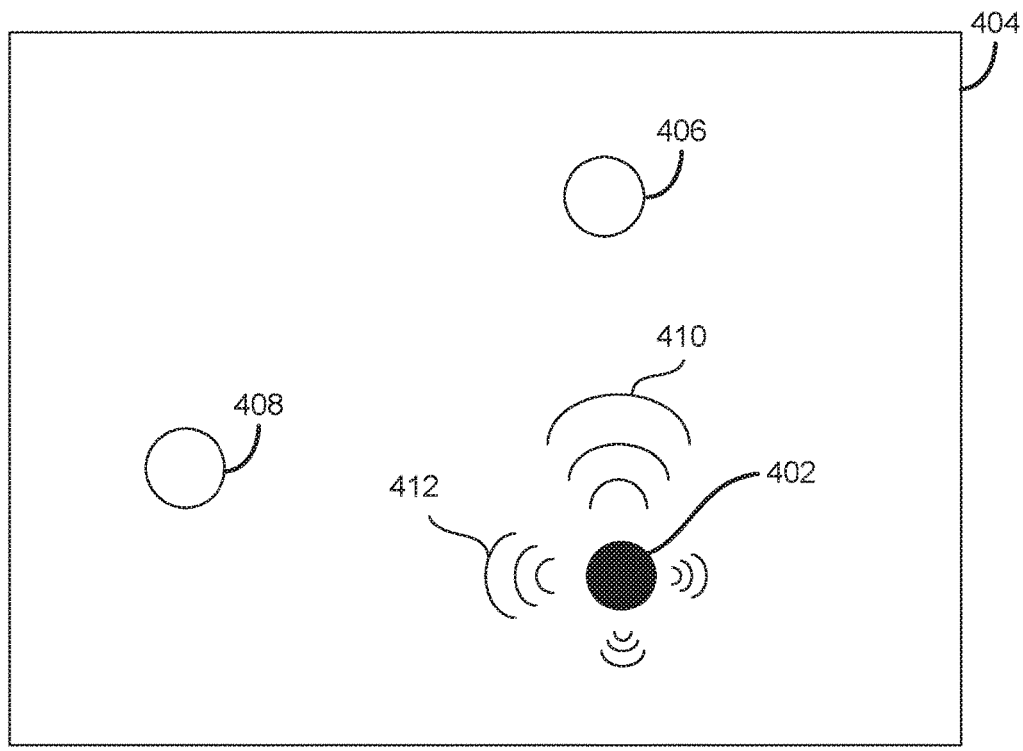
FIG. 4 depicts an illustrative example directional media streaming technique in accordance with at least some embodiments.

FIG. 4 depicts an illustrative example directional media streaming technique in accordance with at least some embodiments. In FIG. 4, a user device 402 is depicted as being located within an enclosure 404. In accordance with at least some embodiments, the user device 402 may identify and locate one or more individuals 406 and 408 within the enclosure. In some embodiments, the user device may employ voice recognition techniques to identify each of the individuals. Additionally, the user device may be configured with several directional microphones located around its circumference. Input gathered by the microphones may be utilized to determine a direction, or at least an approximate direction, in which one or more of the individuals is located.

Each of individuals 406 and 408 may be associated with separate user accounts and/or user configuration settings. For example, individual 406 may be associated with a set of user configuration settings that are different from the set of user configuration settings for individual 408. This may be true even for individuals that live within the same household or use the same account. In some embodiments, individual 406 or 408 may be identified using one or more voice recognition techniques, one or more facial recognition techniques, or any other suitable person identification technique.

The service provider may provide multiple versions of the same media file for consumption by the user device in accordance with the individuals 406 and 408 identified as being within the vicinity of user device 402. For example, individual 406 may be associated with user configuration settings that indicate that individual 406 prefers male vocals. At the same time, individual 408 may be associated with user configuration settings that indicate that individual 408 prefers female vocals. If the media file to be played by user device 402 contains both male and female vocals, then the service provider may generate a first version of the media file 410 having an emphasis on the male vocals and a second version of the media file 412 having an emphasis on the female vocals. In this example, the first version of the media file 410 may be played by a subset of speakers directed at individual 406 and the second version of the media file 412 may be played by a subset of speakers directed at individual 408. In another example, one individual may prefer a higher level of bass than other individuals. Similar to the previous example, the user device may be provided with two different media files, one of which has a greater emphasis on the level of bass.

Figure 5:
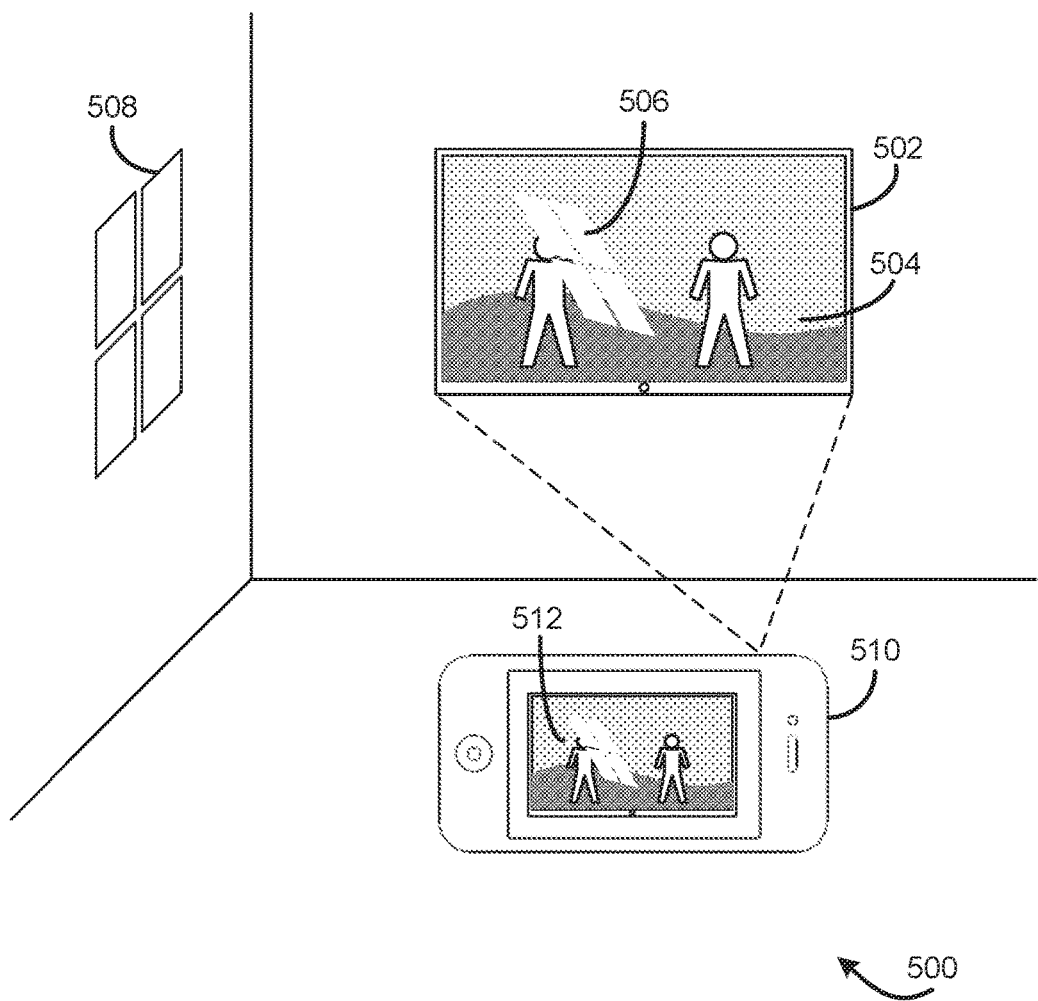
FIG. 5 depicts an illustrative example technique for recording environmental attributes affecting media presentation in accordance with at least some embodiments.

FIG. 5 depicts an illustrative example technique for recording environmental attributes affecting media presentation in accordance with at least some embodiments. In FIG. 5, a display device 502 is depicted as displaying image information 504. A display device may be a television, a monitor, a projection device, or any other device capable of displaying received image information. In some embodiments, a service provider may be a provider of a video streaming service.

Some attributes of an environment in which a media file is presented may make presentation of that media file less than ideal. For example, a display device 502 may be located in a position that is subject to glare 506 or light reflected from a light source 508. In this example, a service provider may be provided with an image of the display device depicting image information as it is viewed by a user. For example, the user may utilize a camera included in a mobile device 510 to capture an image 512 of the display device and the depicted image information 504 from his or her viewpoint. In some embodiments, the service provider is able to identify the user of the mobile device from a serial number associated with the mobile device, login information, a telephone number, or any other unique identifier associated with either the user or the mobile device. For example, in some embodiments, the user may log into a website using a network browser installed on the mobile device. The user may then capture image information 512 and send it directly to the service provider using the network browser. In another example, the user may have an application installed on the user device that connects to the service provider without the use of a network browser. The application may contain account information related to the user that is sent to the service provider. Once executed, the application may activate the mobile device's camera and stream captured image information to the service provider. In some embodiments, the service provider may receive image information from a device located within the enclosure, or room, that includes one or more cameras directed at the display device 502. This is described in more detail with relation to FIG. 7.

Figure 6:
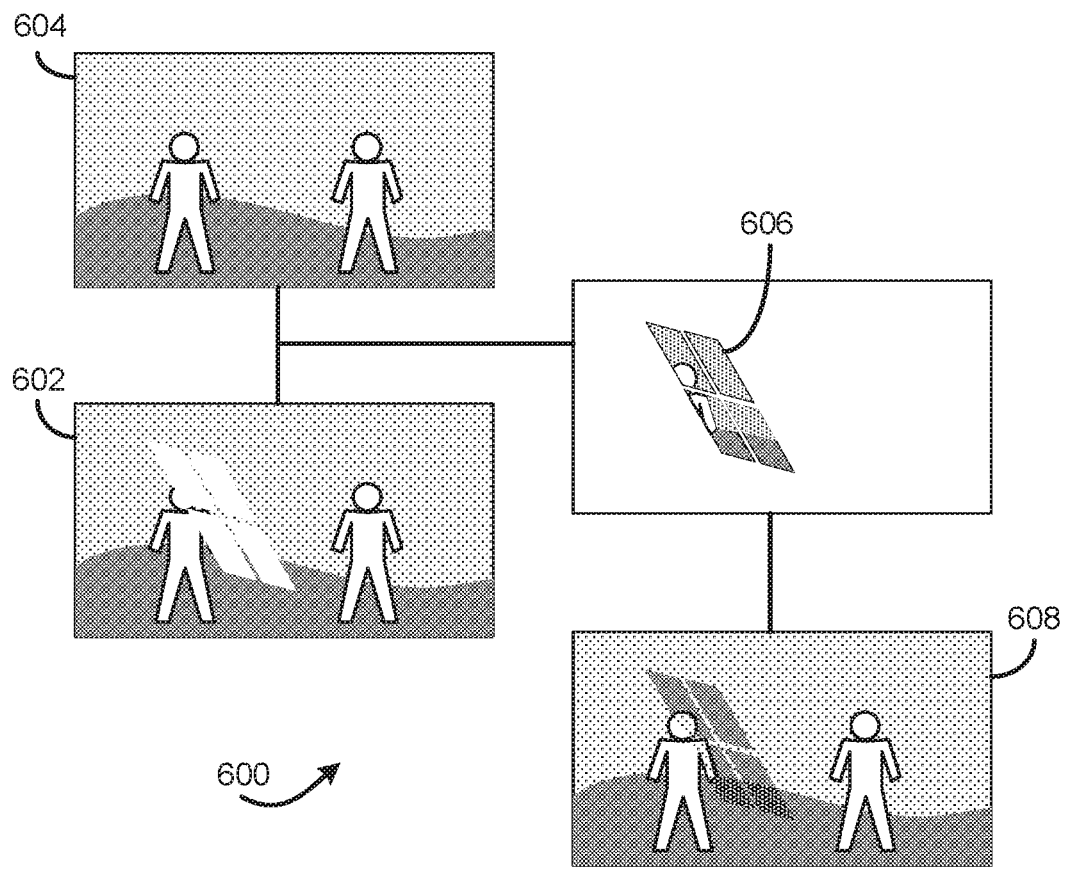
FIG. 6 depicts an illustrative example media tailoring technique in accordance with at least some embodiments.

FIG. 6 depicts an illustrative example media tailoring technique in accordance with at least some embodiments. A service provider may receive image information 602 captured by a separate device (e.g., a mobile device, or any other suitable device). The service provider may provide a streaming media service (e.g., a streaming video or streaming audio service), and may identify the media file 604 currently being streamed to a user device associated with the received image information. The service provider may subsequently compare the received image information to the media file information being streamed at a particular time. For example, the service provider may utilize one or more machine vision and/or pixel mapping techniques to identify the streamed media file 604 or portions thereof within the received image information 602. The service provider may then compare the two images to determine if there are discrepancies 602. To do this, the service provider may use pixel sampling to identify portions of the received image information 602 that do not match their corresponding media file. For example, if the received image information includes glare, or missing pixels, then the service provider may determine that there is a discrepancy 606 at the location of the glare.

Once a discrepancy 606 is identified, the service provider may make an appropriate adjustment 608 to the media file(s) being streamed to the user device. For example, if the received image information indicates that a section of the streamed media file 604 is being subjected to glare, then the service provider may brighten or darken the image in that section in order to decrease the glare. In another example, if the service provider detects that the colors of the image are different from those in the streamed media file, then the service provider may adjust the colors of the streamed media file so that the image information displayed on a display device matches the colors of the streamed media file 604. In some embodiments, the service provider may stream media files to a user device in portions. For example, the service provider may stream a movie file to a user device in two-second segments (a user device generally pulls movie file segments from a network address provided by the service provider). In these embodiments, the service provider may generate a version of the media file including the described adjustments 606. The service provider may then store the generated version of the media files in temporary storage at one or more network addresses accessible to the user device. In some embodiments, the service provider may continue to adjust each provided media file in the same way until it receives instructions not to do so any more. Alternatively, the service provider may receive a second image information that indicates that the adjustment actually causes a discrepancy (when glare is no longer present, the image will still contain the adjustment 608). In some embodiments, the service provider will remove certain adjustments if it receives an indication that a light level associated with the room in which a display device is located has changed.

Figure 7:
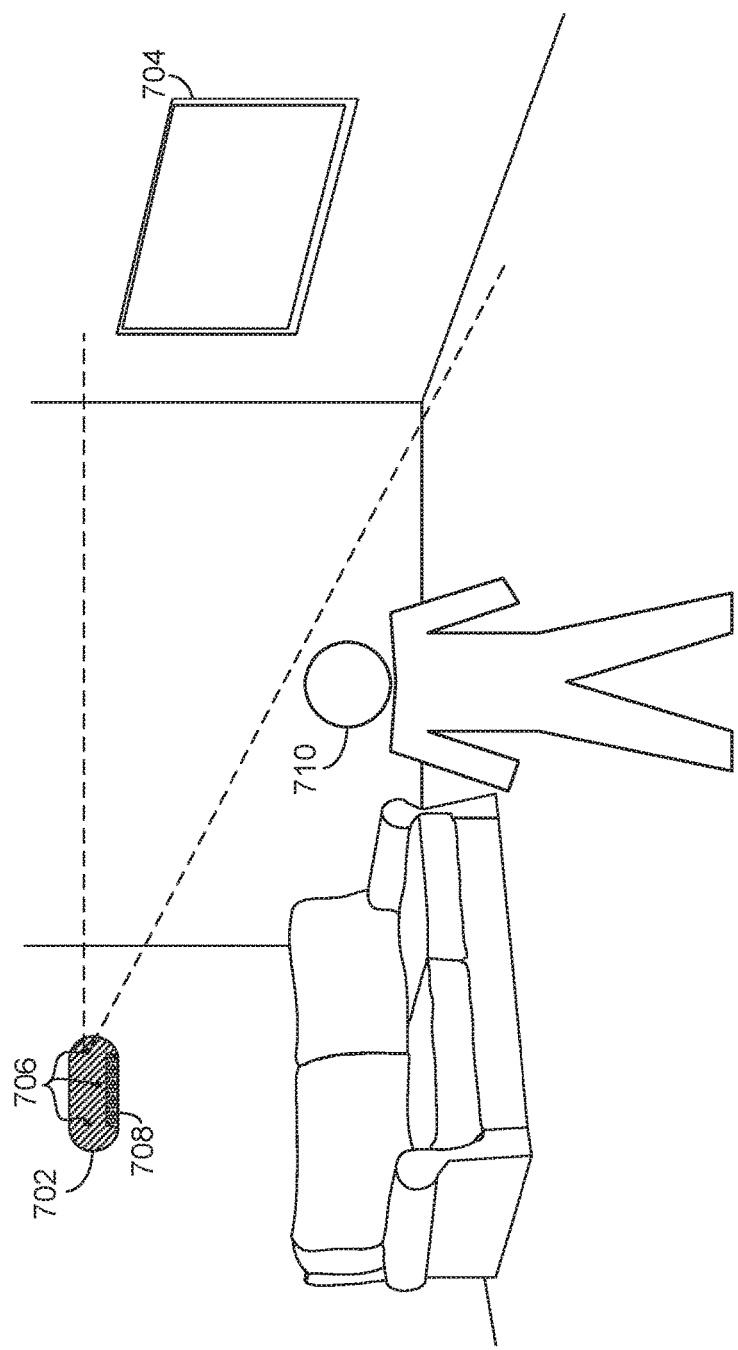
FIG. 7 depicts an illustrative example media presentation monitoring device in accordance with at least some embodiments.

FIG. 7 depicts an illustrative example media presentation monitoring device in accordance with at least some embodiments. The media monitoring device 702 may be in communication with a service provider that provides one or more media files to a display device 704. The media monitoring device may include one or more input sensors 706 capable of monitoring media. For example, the media monitoring device may include one or more cameras capable of capturing an image of the display device 704 and transmitting the captured image information to the service provider. In this example, there may be multiple cameras that are offset vertically and/or horizontally. Additionally, the media monitoring device 702 may include one or more sensors 708 capable of determining attributes of an environment in which the media monitoring device 702 is located. For example, in at least some embodiments, the media monitoring device 702 may include an infrared sensor 708 capable of detecting and tracking a user 710. In this scenario, the media monitoring device may be configured to calculate a location at which glare or other discrepancies would appear to the user 710. This is described in greater detail with respect to FIG. 8 below. In some embodiments, the media monitoring device may be part of another device. For example, the media monitoring device may be included in a speaker system designed to provide surround sound.

Figure 8:
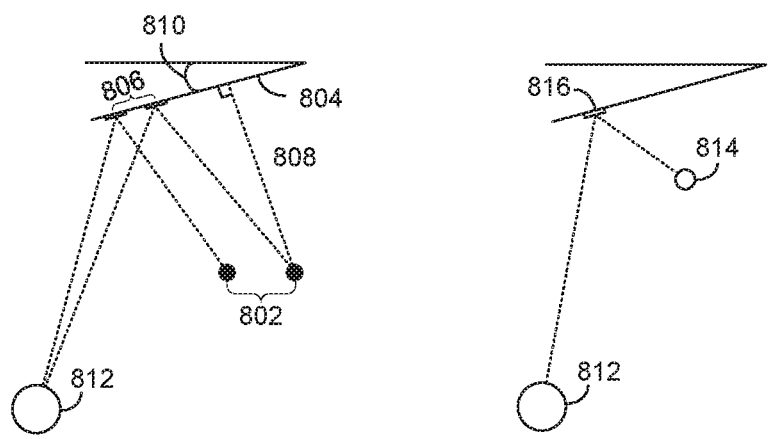
FIG. 8 depicts some example techniques for determining a portion of an image media file to be enhanced in accordance with at least some embodiments.

FIG. 8 depicts some example techniques for determining a portion of an image media file to be enhanced in accordance with at least some embodiments. In FIG. 8, one or more input sensors 802 may each be configured to capture media presentation information. For example, glare is caused when a light source is reflected off of a display device surface. However, the portion of a display device affected by glare depends on where the light source is and where the user viewing the display device is. Accordingly, a media monitoring device configured to reduce glare may include multiple cameras 802.

In some embodiments, the multiple cameras 802 may be configured to capture image information from a display device 804. Each of the multiple cameras 802 may detect glare at a different location 806 on the display device 804. The media monitoring device may use distance 808 information along with an angle 810 to calculate an incident angle of the reflected glare and subsequently the location of a light source 812. Distance 808 and angle 810 may be determined from environmental attribute information previously collected. For example, the media monitoring device may emit a high-frequency sound and detect the echo to determine a rough shape of the room around it. Alternatively, the media monitoring device may use a number of range-finding techniques along with computer vision to calculate distances from key points within an enclosed space. In some embodiments, cameras that are offset horizontally may provide a location of the light source 812 along a horizontal axis, and cameras that are offset vertically may provide a location of the light source 812 along a vertical axis. Accordingly, a media monitoring device may include three or more cameras, two of which are offset horizontally and two of which are offset vertically.

Once a light source 812 is located, the media monitoring device may utilize the location information to tailor the media to a particular user 814. For example, the media monitoring device may determine the location of a particular user 814 within the enclosed space. The media monitoring device may subsequently calculate the location 816 on the display device that the glare will appear to the user 814. Upon making this determination, the media monitoring device may provide this information to the service provider.

Figure 9:
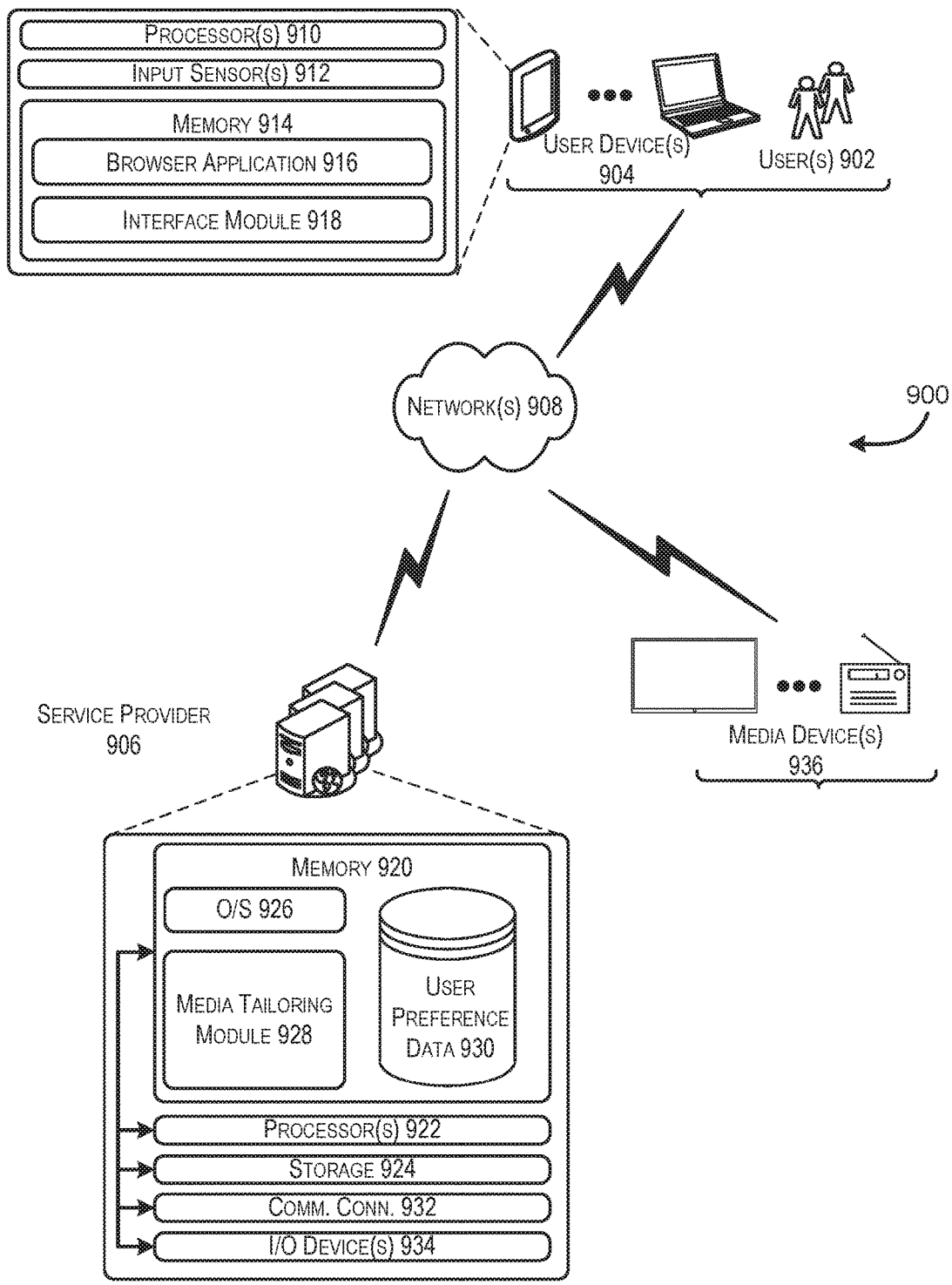
FIG. 9 depicts an illustrative example of a system or architecture in which techniques for providing tailored media files may be implemented.

FIG. 9 depicts an illustrative example of a system or architecture 900 in which techniques for providing tailored media files may be implemented. In architecture 900, one or more consumers and/or users 902 may utilize user devices 904. In some examples, the user devices 904 may be in communication with a service provider 906 via the network(s) 908, or via other network connections.

The user devices 904 may be any type of computing device such as, but not limited to, a mobile phone, a smart phone, a personal digital assistant (PDA), a laptop computer, a desktop computer, a server computer, a thin-client device, a tablet PC, etc. Additionally, user devices 904 may be any type of wearable technology device, such as a watch, earpiece, glasses, etc. The user device 904 may include one or more processors 910 capable of processing user input. The user device 904 may also include one or more input sensors 912 for receiving user input. As is known in the art, there are a variety of input sensors 912 capable of detecting user input, such as accelerometers, cameras, microphones, etc. The user input obtained by the input sensors may be from a variety of data input types, including, but not limited to, audio data, visual data, or biometric data. Embodiments of the application on the user device 904 may be stored and executed from its memory 914. In some embodiments, the user device 902 may be the media monitoring device 702 of FIG. 7.

Turning to the contents of the memory 914 in more detail, the memory 914 may include a browser application 916. The memory 914 may also include an interface module 918 that is capable of enabling a user to interact with a service provider to tailor media presentation. Although sample architecture 900 depicts a user interface module 918 as being included in the contents of the memory 914 of the user device 904, some embodiments may not include a user interface module 918 in memory 914 of the user device 904. In those embodiments in which the interface module 918 is not included in memory 914, input received by the input sensors 912 may instead be processed by the service provider 906. This will be described in detail below.

In some embodiments, the interface module 918 may be configured to collect information related to media presentation and provide it to a service provider. For example, the interface module 918 may be configured to capture image information associated with media presentation. In some embodiments, the interface module 918 may be configured to allow one or more users to provide preference settings. For example, a user may indicate settings that should be applied to a particular media file, a particular genre of media files, or based on any other suitable criteria. For example, a particular user may indicate that when he or she is listening to rap music, the bass should be increased.

In some examples, the network(s) 908 may include any one or a combination of many different types of networks, such as cable networks, the Internet, wireless networks, cellular networks, and other private and/or public networks. While the illustrated example represents the users 902 accessing the service provider 906 via browser application 916 over the network(s) 908, the described techniques may equally apply in instances where the users 902 interact with a service provider 906 via the user device 904 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 916 may allow the users 902 to interact with a service provider 906, such as to store, access, and/or manage data, develop and/or deploy computer applications, and/or interact with web content. The one or more service providers 906, perhaps arranged in a cluster of servers or as a server farm, may be configured to host a website (or combination of websites) viewable via the user device 904 or a web browser accessible by a user device 904 via the browser application 916. Although depicted in memory of the user device 904 in this example, in some embodiments the browser application 916 may be hosted at a server. For example, the user device 904 may be a thin client device capable of accessing a browser application 916 remotely. The browser application 916 may be capable of handling requests from many users 902 and serving, in response, various user interfaces that can be rendered at the user device 904 such as, but not limited to, a web site. The browser application 916 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 916, such as with other applications running on the user device 904.

The service provider 906 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 906 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 906 may include at least one memory 920 and one or more processing units (or processor(s)) 922. The processor(s) 922 may be implemented as appropriate in hardware, computer-executable instructions, firmware, or combinations thereof. Computer-executable instruction or firmware implementations of the processor(s) 922 may include computer-executable or machine executable instructions written in any suitable programming language to perform the various functions described.

The memory 920 may store program instructions that are loadable and executable on the processor(s) 922, as well as data generated during the execution of these programs. Depending on the configuration and type of service provider 906, the memory 920 may be volatile (such as random access memory (RAM)) and/or non-volatile (such as read-only memory (ROM), flash memory, etc.). The service provider 906 may also include additional storage 924, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 920 may include multiple different types of memory, such as static random access memory (SRAM), dynamic random access memory (DRAM) or ROM. Turning to the contents of the memory 920 in more detail, the memory 920 may include an operating system 926 and one or more application programs or services for implementing the features disclosed herein including at least a module for tailoring media in accordance with environmental attributes or user preferences (media tailoring module 928). The memory 920 may also include user preference data 930, which provides user preferences and other formatting rules. In some embodiments, the user preference data 930 may be stored in a database.

The memory 920 and the additional storage 924, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. As used herein, modules may refer to programming modules executed by computing systems (e.g., processors) that are part of the user device 904 or the service provider 906. The service provider 906 may also contain communications connection(s) 932 that allow the service provider 906 to communicate with a stored database, another computing device or server, user terminals, and/or other devices on the network(s) 908. The service provider 906 may also include input/output (I/O) device(s) and/or ports 934, such as for enabling connection with a keyboard, a mouse, a pen, a voice input device, a touch input device, a display, speakers, a printer, etc.

In some embodiments, system or architecture 900 may include one or more media devices 936. Service provider 906 may be a provider of a media streaming service. A media device may be any device capable of receiving and playing a media file from the service provider. For example, the media device may be an internet radio, an mp3 player, a television, or any other suitable media player. In at least some embodiments, user device 904 may also be a media device 936.

Turning to the contents of the memory 920 in more detail, the memory 920 may include an operating system 926, a database containing user preference data 930 and the one or more application programs or services for implementing the features disclosed herein, including a media tailoring module 928.

In some embodiments, the media tailoring module 928 may be configured to receive data from the interface module 928 and provide tailored media files to media device 936. For example, the service provider 906 may receive a request from the user device 904 to play a particular media file. The media tailoring module 928 may be configured to identify, based on metadata related to the media file, rules related to playing the media file stored in user preference data 930. Once identified, the media tailoring module 928 may be configured to generate a media file in accordance with those rules. For example, the service provider may determine, based on a rule stored in user preference data 930, that a user prefers male vocals to female vocals. In this example, the media tailoring module 928 may be configured to increase the relative volume of any male vocal tracks and decrease the relative volume of any female vocal tracks in a music file. The media tailoring module 928 may then be configured to generate a music file, with the tailored track information, of a specified format. For example, the received request may include an indication that an mp3 file is needed. In some embodiments, the service provider 906 may assess the capabilities of the media device 936 in order to determine which file formats are supported. For example, the service provider may determine that the media device is an mp3 player. In this example, the service provider may generate an mp3 formatted media file to provide to the media device 936. In another example, the service provider may determine that the media device 936 is a personal computer, the service provider may also receive an indication of what media player applications are installed on the device. In this example, the service provider may assess the various applications installed on the media device and may, in turn, select an appropriate media file format from those available. By way of further example, the service provider may elect the media format type that would result in the highest quality of media presentation. In some embodiments, each track (or media component) may be provided to the media device 936 separately. In some embodiments, multiple versions of a media file may be provided to a single media device simultaneously. For example, a music player with speakers arranged in a circular fashion may receive slightly different versions of the same media file. A subset of the speakers may play each of the provided media files.

User preference data 930 may be predetermined or it may be dynamically generated. For example, the service provider 906 may begin to provide a media file to a media device 936, and the user may indicate that his or her preferences have changed. In this example, the service provider may adjust one or more of the tracks accordingly via the media tailoring module 928. In some embodiments, the user preference data 930 may include information related to environmental attributes surrounding the media device 936. For example, user preference data 930 may include information related to the size or layout of a room in which the media device 936 is located. Additionally, user preference data 930 may include information related to light reflections (e.g., glare) or other issues with a media device 936. In some embodiments, the user preference data 930 may maintain separate rules or settings for different media devices 936 or different contexts. For example, music provided to a user's mobile device may be subjected to different rules than music provided to a user's internet radio player. In another example, a user may have different user preferences depending on a situation or context, such as if the user is traveling. By way of further example, a user's mobile device location information may indicate that the user is traveling or the user may put his or her device into airplane mode. In this example, the user preferences associated with the user's situation may be applied to the media file.

Figure 10:
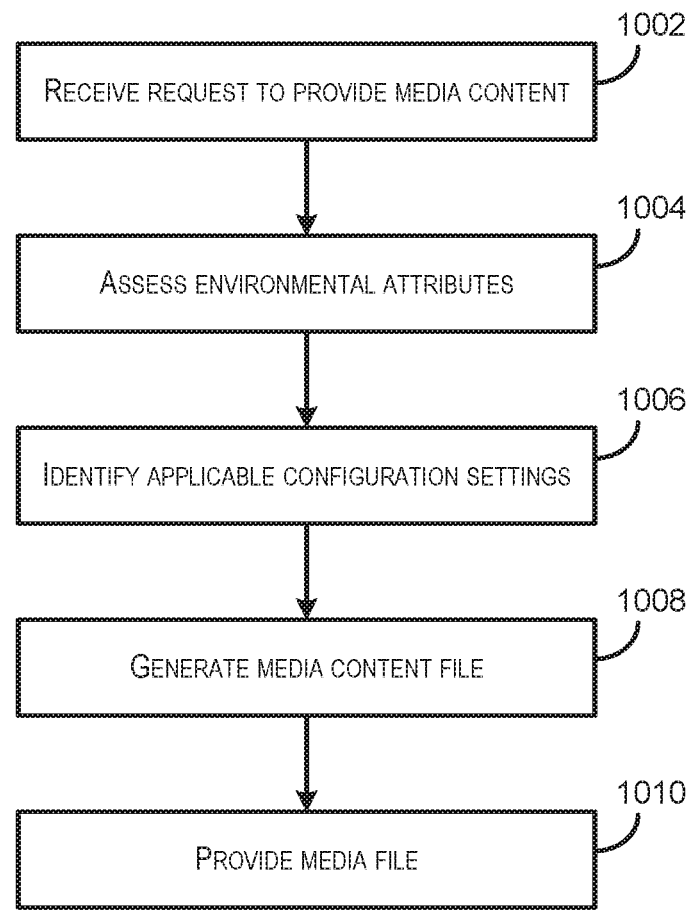
FIG. 10 depicts an illustrative flow chart demonstrating an example platform for providing tailored media content in accordance with at least some embodiments.

FIG. 10 depicts an illustrative flow chart demonstrating an example platform for providing tailored media content in accordance with at least some embodiments. The process 1000 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 1000 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 1000 of FIG. 10 may be performed by at least the one or more service providers 906 depicted in FIG. 9. The code may be stored on a computer-readable storage medium, for example, in the form of a computer program including a plurality of instructions executable by one or more processors. The computer-readable storage medium may be non-transitory.

Process 1000 may begin at 1002 when a request is received by a service provider to provide media content. In some embodiments, the request may be received by a media player, such as an internet radio, a music player, television, or any other suitable media player. The media content may be stored by the service provider in a data store. In some embodiments, the media content may be stored as separate components (e.g., separate tracks). Additionally, the service provider may be provided with an indication of one or more attributes related to the environment at 1004. For example, the service provider may be provided with a size or shape of the room that the media player is located within. As another example, the service provider may be provided with the capabilities of the media player (speaker size, speaker configuration, maximum volume, available display colors, etc.). In some embodiments, the service provider may assess these environment attributes according to one or more pre-set rules. For example, a rule may dictate that if the device is within 2 feet of a wall, bass directed at that wall should be lowered.

The service provider may identify applicable configuration settings at 1006. For example, one or more users may provide user configuration settings based on user preferences. In one example, a user may indicate that he or she prefers male vocals to female vocals when listening to music. The service provider, when generating media content for the user, may reduce the relative volume of a female vocal track and increase the relative volume of a male vocal track. This results in the service provider generating a music file with an emphasis on male vocals, which may be more enjoyable for the requesting user. In some embodiments, a user may indicate that he or she prefers a particular instrument and would like it emphasized. For example, a user may indicate that he or she would like an increased volume of "cowbell." In this example, the service provider may generate a version of the music file containing more cowbell. User configuration settings may be applied to a single media file, every media file, or every media file falling within a specified genre. A media file may be generated for any format. For example, the service provider may generate a music file as an mp3 file format, and mp4 file format, a way file format, or any other suitable music format. Once the media file has been generated at 1008, it may be provided to the media player at 1010.

In some embodiments, multiple media files may be provided to a media player. For example, the service provider may determine that two users are located in a room with a media player device that supports multiple speakers. The service provider may generate two versions of the music file according to the preferences of the two users, and may subsequently provide both music files to the media player device. In this example, the media player device may play one version on a subset of the supported speakers and the other version on a different subset of the speakers, so that the two users hear different versions of the same music.

Figure 11:
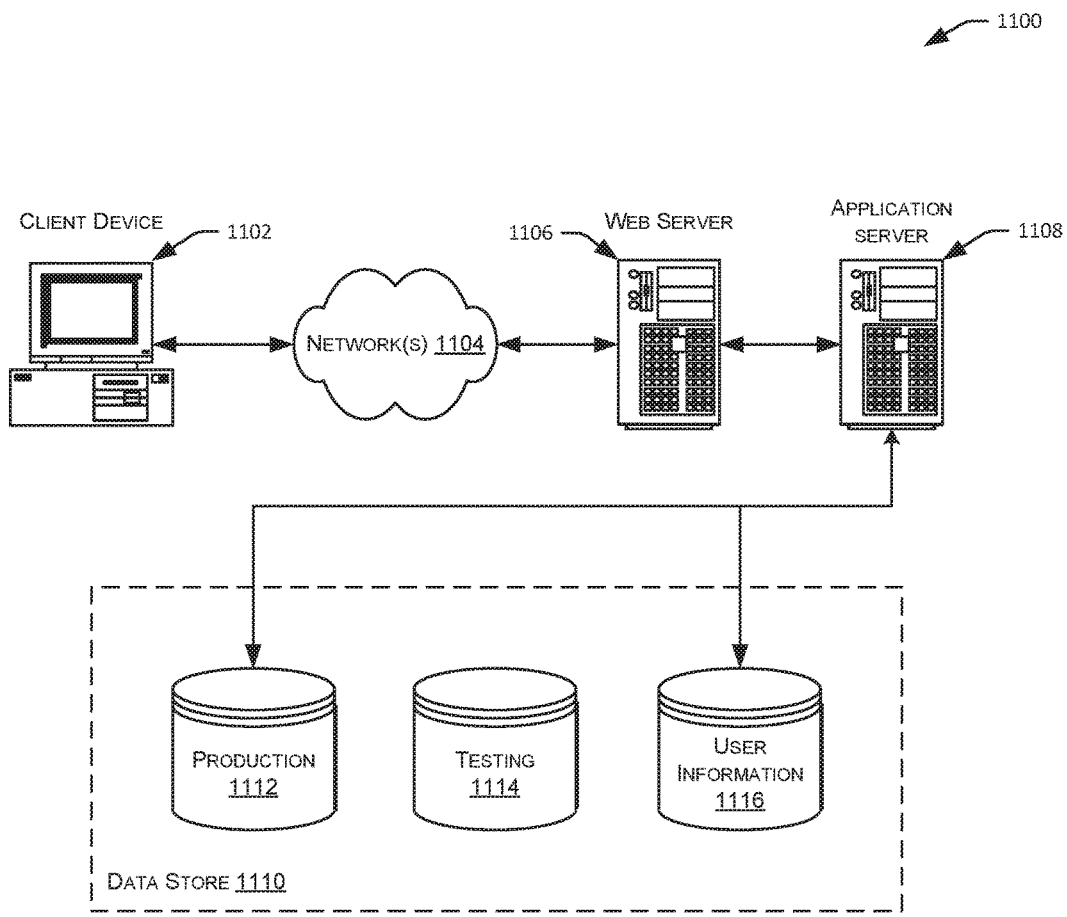
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102.

Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

Figure 12:
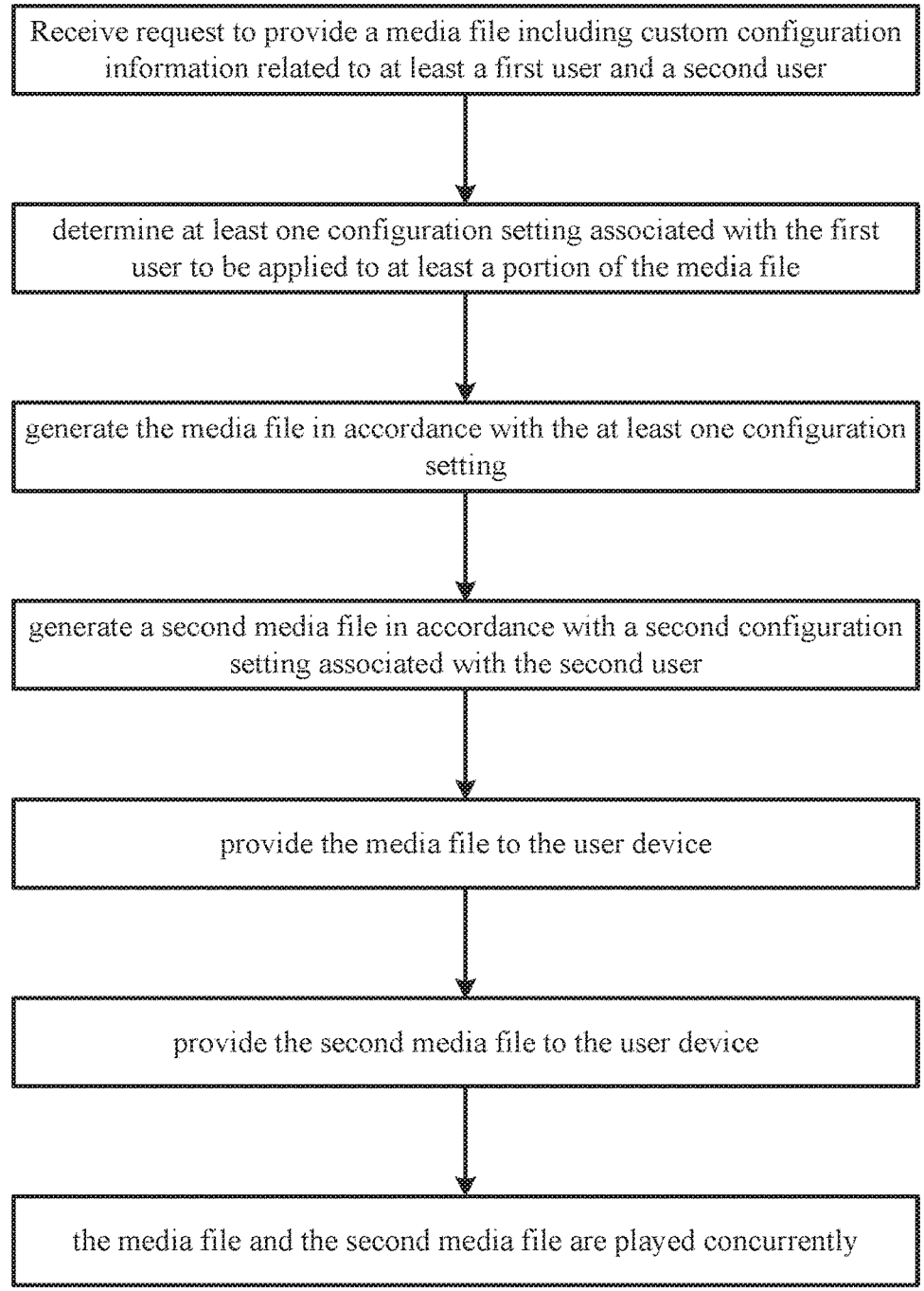
FIG. 12 depicts a flow diagram demonstrating an example process for providing tailored media content in accordance with at least some embodiments.

FIG. 12 depicts a flow diagram demonstrating an example process for providing tailored media content in accordance with at least some embodiments. Each of the features depicted in FIG. 12 is described elsewhere in the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
   receiving, at a service provider, a request to provide streaming media content to a media player device;
   identifying a user and a second user in a vicinity of the media player device;
   identifying a first user configuration setting associated with the user from a plurality of user configuration settings stored at a data store;
   identifying a second user configuration setting associated with the second user from the plurality of user configuration settings stored at the data store;
   determining that the first user configuration setting and the second user configuration setting are to be applied to one or more components of the streaming media content;
   generating a first version of the streaming media content from a plurality of separate components stored at the service provider by applying the first user configuration setting to at least one first component of the plurality of separate components and combining the plurality of separate components;
   generating a second version of the streaming media content from the plurality of separate components stored at the service provider by applying the second user configuration setting to at least one second component of the plurality of separate components and combining the plurality of separate components; and
   providing the first version and second version of the generated streaming media content to the media player device, wherein the first version and second version of the generated streaming media content are caused to be played concurrently by the media player device.

2. The method of claim 1, wherein the first user configuration setting comprises at least one of audio preferences or video preferences for the user.

3. The method of claim 2, wherein the streaming media content is a music file and the component of the streaming media content is one of a plurality of tracks that are included in the music file.

4. The method of claim 1, wherein the streaming media content is generated in a specified media file format.

5. The method of claim 1, wherein determining the first user configuration setting and the second user configuration setting are to be applied to one or more components of the streaming media content is based at least in part on a genre associated with the streaming media content.

6. A system comprising:
   a processor device;
   a memory including instructions that, when executed with the processor, cause the system to at least:
   receive, from a user device, a request to provide a media file, the request including custom configuration information that includes information related to at least a first user and a second user;
   determine, based at least in part on the custom configuration information, at least one configuration setting associated with the first user to be applied to at least a portion of the media file;

generate a first version of the media file in accordance with the at least one configuration setting;

determine, based at least in part on the custom configuration information, a second configuration setting associated with the second user to be applied to at least a second portion of the media file;

generate a second version of the media file in accordance with the second configuration setting associated with the second user;

provide the first version of the media file to the user device; and provide the second version of the media file to the user device, wherein the first version of media file and the second version of the media file are caused to be played concurrently by the user device.

7. The system of claim 6, further comprising one or more input sensors configured to detect attributes related to an environment in which the user device is located.

8. The system of claim 7, wherein the at least one configuration setting to be applied to at least a portion of the media file is determined based at least in part on the detected attributes related to the environment.

9. The system of claim 7, wherein the attributes related to the environment include a size or shape of a room in which the user device is located.

10. The system of claim 6, wherein the media file is a music file, and generating the first version of the media file in accordance with the at least one configuration setting comprises altering at least one track associated with the music file.

11. The system of claim 6, wherein the media file is a music file, and generating the first version of the media file in accordance with the at least one configuration setting comprises omitting at least one track associated with the music file.

12. The system of claim 6, wherein the instructions further cause the system to at least determine; based on at least in part on the user device; an appropriate media file format, the first version of the media file being generated in the appropriate media file format.

13. A non-transitory computer readable medium storing specific computer-executable instructions that, when executed by a processor; cause a computer system to at least:

receive, from a user device, a request to provide a media file from media content stored in a data store;

identify a user and a second user associated with the request based at least in part on information received from the user device;

determine at least one custom configuration setting associated with the user to be applied to the media content;

identify at least one second configuration setting associated with the second user;

generate the media file for the media content in accordance with the at least one custom configuration setting;

generate a second media file for the media content in accordance with the at least one second configuration setting;

provide the media file to the user device for presentation to the user; and provide the second media file to the user device for presentation to the second user such that the media file and the second media file are caused to be played concurrently by the user device.

14. The computer readable medium of claim 13, wherein the instructions further cause the computer system to at least detect, using one or more sensors, a location of the user with respect to the user device.

15. The computer readable medium of claim 13, wherein the second user is identified using one or more sensors.

16. The computer readable medium of claim 13, wherein the media file and the second media file are played concurrently.

17. The computer readable medium of claim 13, wherein the media content includes multiple components to be used to generate the media file.

18. The computer readable medium of claim 17, wherein the media content also includes a timeline file indicating how the multiple components are to be assembled into the media file.

19. The computer readable medium of claim 17, wherein the media content includes a metadata file storing information related to the media content and the multiple components.

* * * * *

UNITED STATES PATENT AND TRADEMARK OFFICE
CERTIFICATE OF CORRECTION

PATENT NO. : 10,140,083 B1
APPLICATION NO. : 14/863213
DATED : November 27, 2018
INVENTOR(S) : Luan Khai Nguyen and William Alexander Strand Page 1 of 1

It is certified that error appears in the above-identified patent and that said Letters Patent is hereby corrected as shown below:

On the Title Page

Item (73), Assignee:
Delete: "Amazon Technolgies, Inc."
Insert: --Amazon Technologies, Inc.--

In the Claims

Column 19, Line 37, Claim 12:
Delete: "cause the system to at least determine; based on at least in"
Insert: --cause the system to at least determine, based on at least in--

Column 19, Line 38, Claim 12:
Delete: "part on the user device; an appropriate media file format, the"
Insert: --part on the user device, an appropriate media file format, the--

Column 19, Line 43, Claim 13:
Delete: "executed by a processor; cause a computer system to at least:"
Insert: --executed by a processor, cause a computer system to at least:--

Signed and Sealed this
Sixteenth Day of July, 2019

Andrei Iancu
*Director of the United States Patent and Trademark Office*